US011788860B2

(12) United States Patent
Mosebach et al.

(10) Patent No.: US 11,788,860 B2
(45) Date of Patent: Oct. 17, 2023

(54) METHOD FOR OPERATING A SYSTEM WITH AT LEAST TWO AUTOMATICALLY MOVING FLOOR PROCESSING DEVICES AS WELL AS SYSTEM FOR IMPLEMENTING SUCH A METHOD

(71) Applicant: Vorwerk & Co. Interholding GmbH, Wuppertal (DE)

(72) Inventors: Andrej Mosebach, Unna (DE); Marc Papenheim, Wuppertal (DE); Henning Hayn, Hilden (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 474 days.

(21) Appl. No.: 17/147,622

(22) Filed: Jan. 13, 2021

(65) Prior Publication Data

US 2021/0215502 A1 Jul. 15, 2021

(30) Foreign Application Priority Data

Jan. 14, 2020 (DE) .................... 10 2020 100 666.7

(51) Int. Cl.
*A47L 11/40* (2006.01)
*G01C 21/00* (2006.01)
(Continued)

(52) U.S. Cl.
CPC .......... *G01C 21/383* (2020.08); *A47L 9/2805* (2013.01); *A47L 9/2852* (2013.01);
(Continued)

(58) Field of Classification Search
CPC ... G01C 21/383; A47L 9/2805; A47L 9/2852; A47L 11/4011; A47L 11/4061;
(Continued)

(56) References Cited

U.S. PATENT DOCUMENTS

2018/0361569 A1* 12/2018 Hackert ................. B25J 9/0084
2019/0045993 A1* 2/2019 Hahn ..................... A47L 9/2857
(Continued)

FOREIGN PATENT DOCUMENTS

EP          3440975 B1 *  9/2022  ............. A47L 11/40
WO      2018/202337 A1    11/2018

*Primary Examiner* — B M M Hannan
(74) *Attorney, Agent, or Firm* — Collard & Roe, P.C.

(57) ABSTRACT

A method for operating a system with at least two floor processing devices includes detecting environmental features of an environment and generating an area map based on the detected features. The area map is divided into partial areas that are assigned to the floor processing devices so that each partial area is only processed by one of the floor processing devices. A movement route and a movement timespan of the floor processing device is detected and stored with the area map. Several partial areas are combined into partial area groups, and the partial areas are allocated to the floor processing devices based on the stored movement route and movement timespan so that a floor processing of a first partial area group by a first floor processing device takes place at essentially the same time as a floor processing of a second partial area group by a second floor processing device ends.

10 Claims, 8 Drawing Sheets

(51) Int. Cl.
  *A47L 9/28*     (2006.01)
  *G05B 19/4155*  (2006.01)
  *G05D 1/02*     (2020.01)

(52) U.S. Cl.
  CPC ....... *A47L 11/4011* (2013.01); *A47L 11/4061* (2013.01); *A47L 11/4066* (2013.01); *G05B 19/4155* (2013.01); *A47L 2201/04* (2013.01); *G05B 2219/45098* (2013.01); *G05D 1/0221* (2013.01); *G05D 2201/0203* (2013.01)

(58) Field of Classification Search
  CPC ............. A47L 11/4066; A47L 2201/04; G05B 19/4155; G05B 2219/45098; G05D 1/0221; G05D 2201/0203; G05D 1/0291; G05D 1/0274; G05D 1/0212; G05D 1/0236
  USPC .......................................................... 701/41
  See application file for complete search history.

(56) References Cited

U.S. PATENT DOCUMENTS

2019/0346853 A1\* 11/2019 Gabrecht ............. G05D 1/0225
2020/0050215 A1   2/2020  Kessler et al.

\* cited by examiner

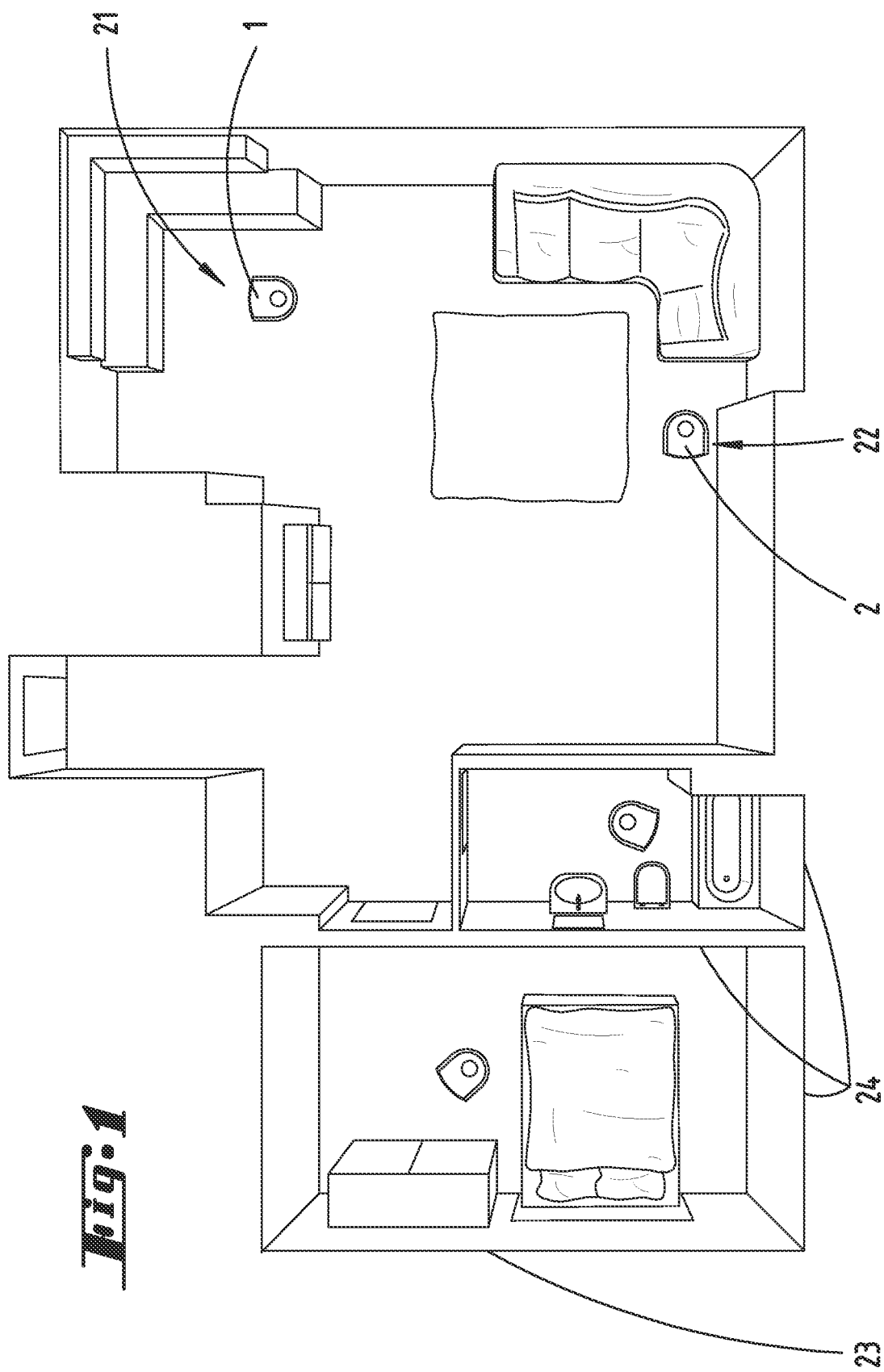

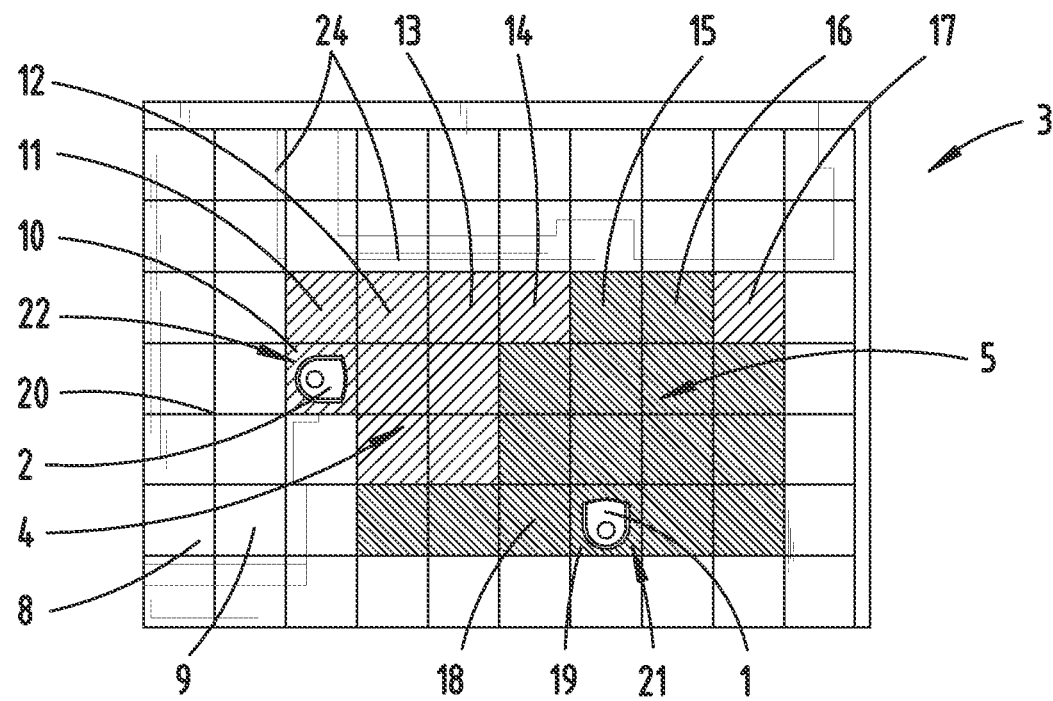
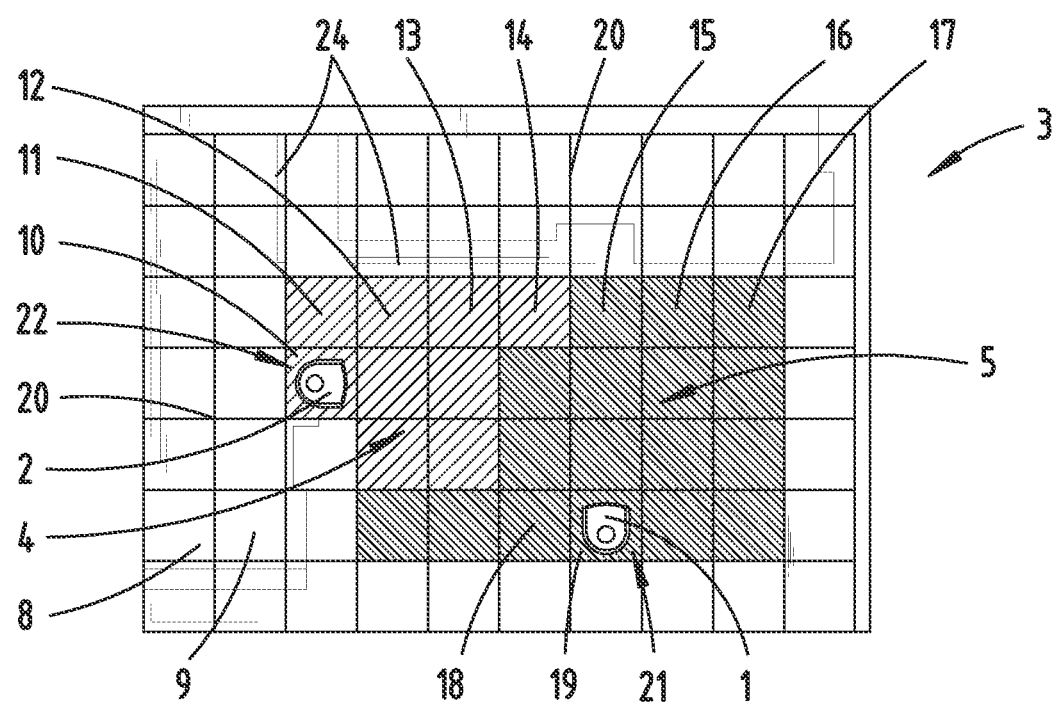

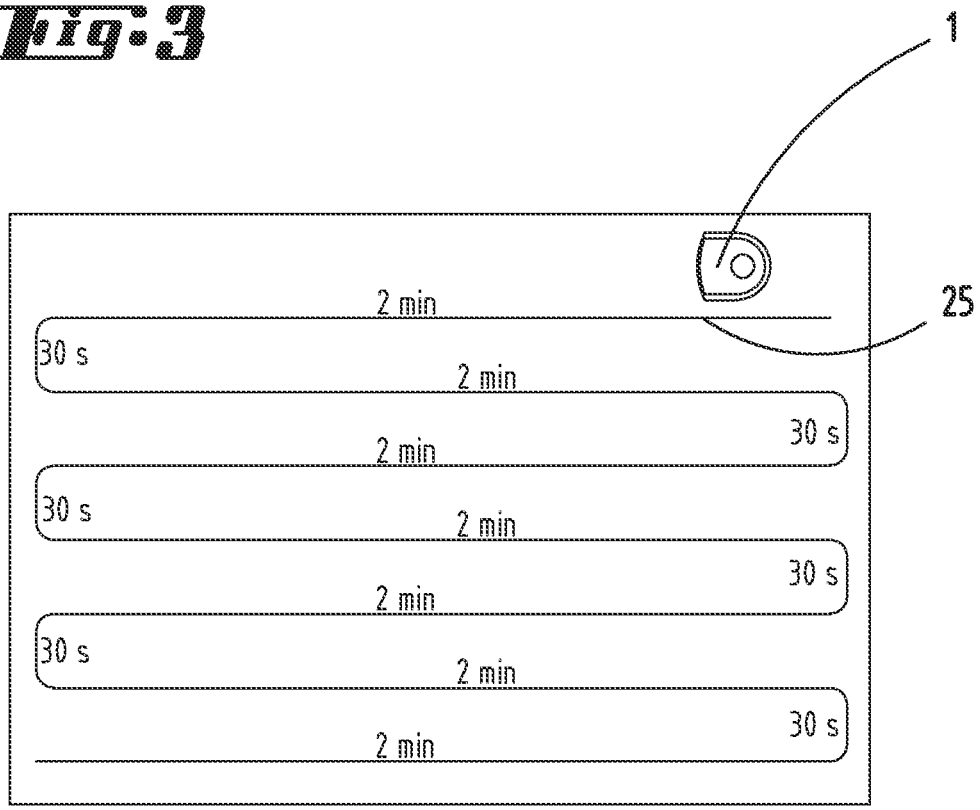

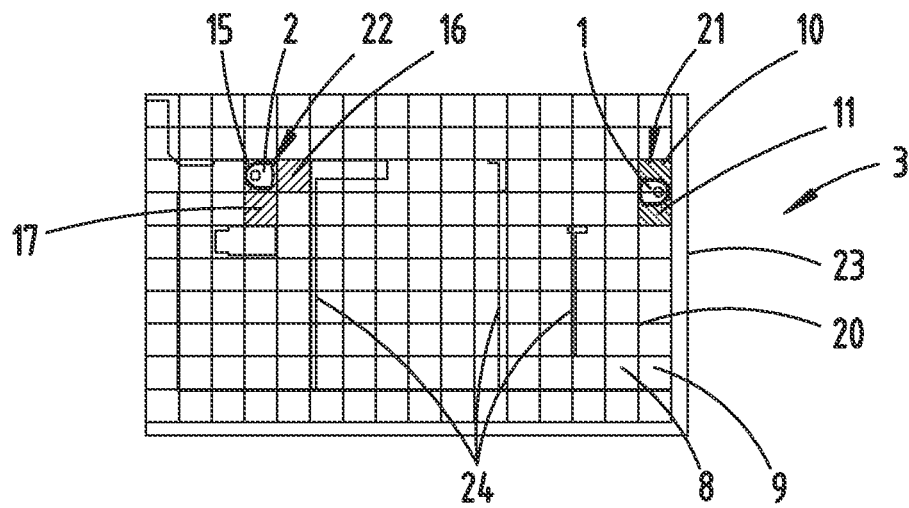
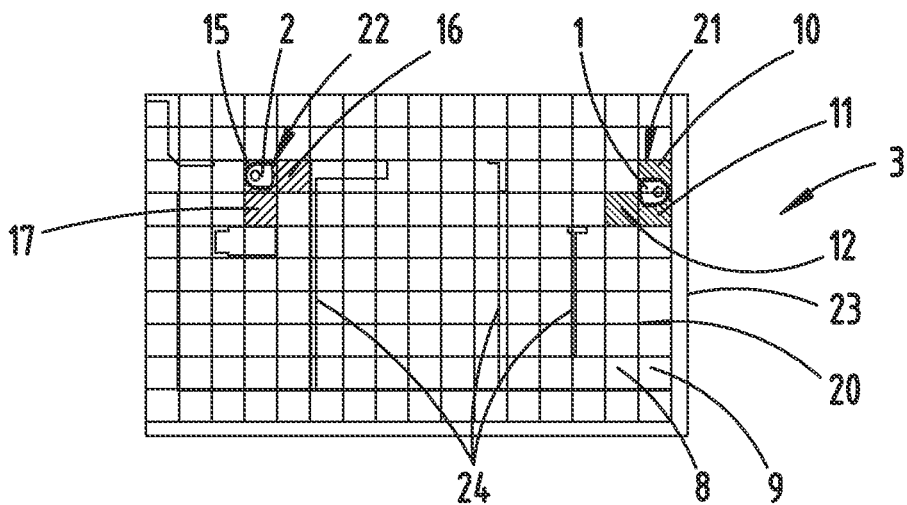
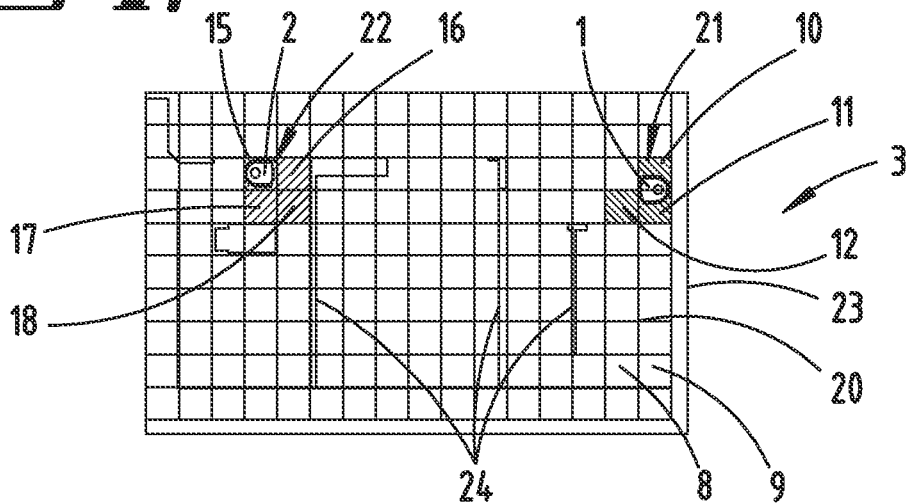

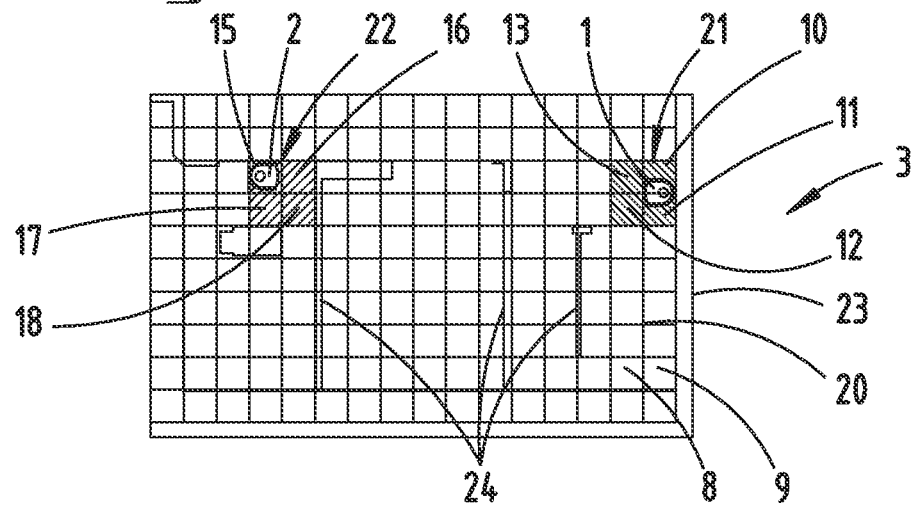
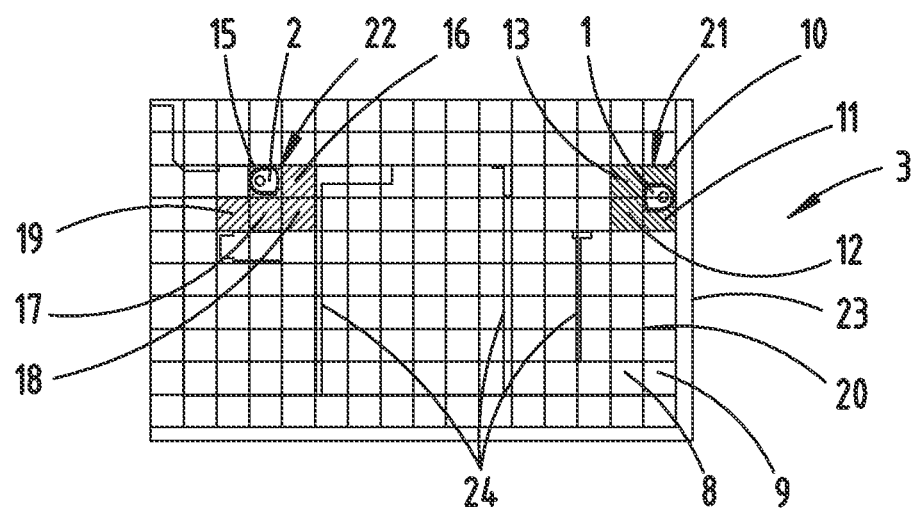
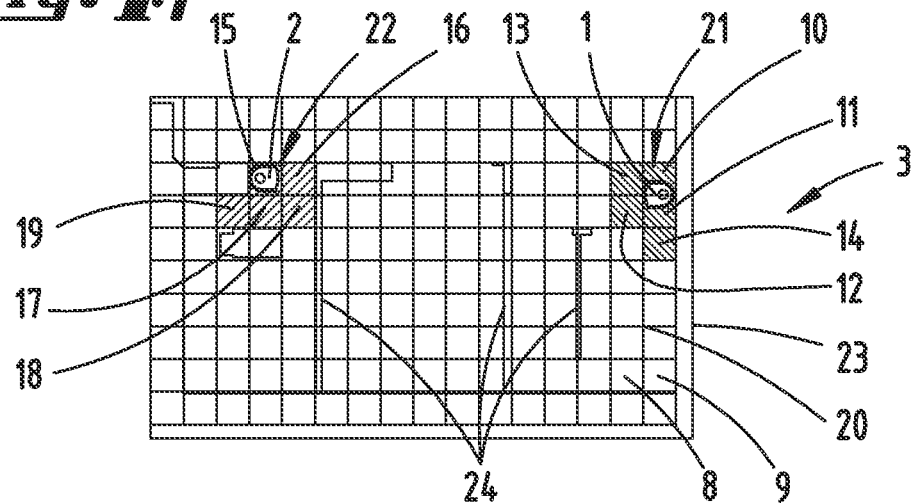

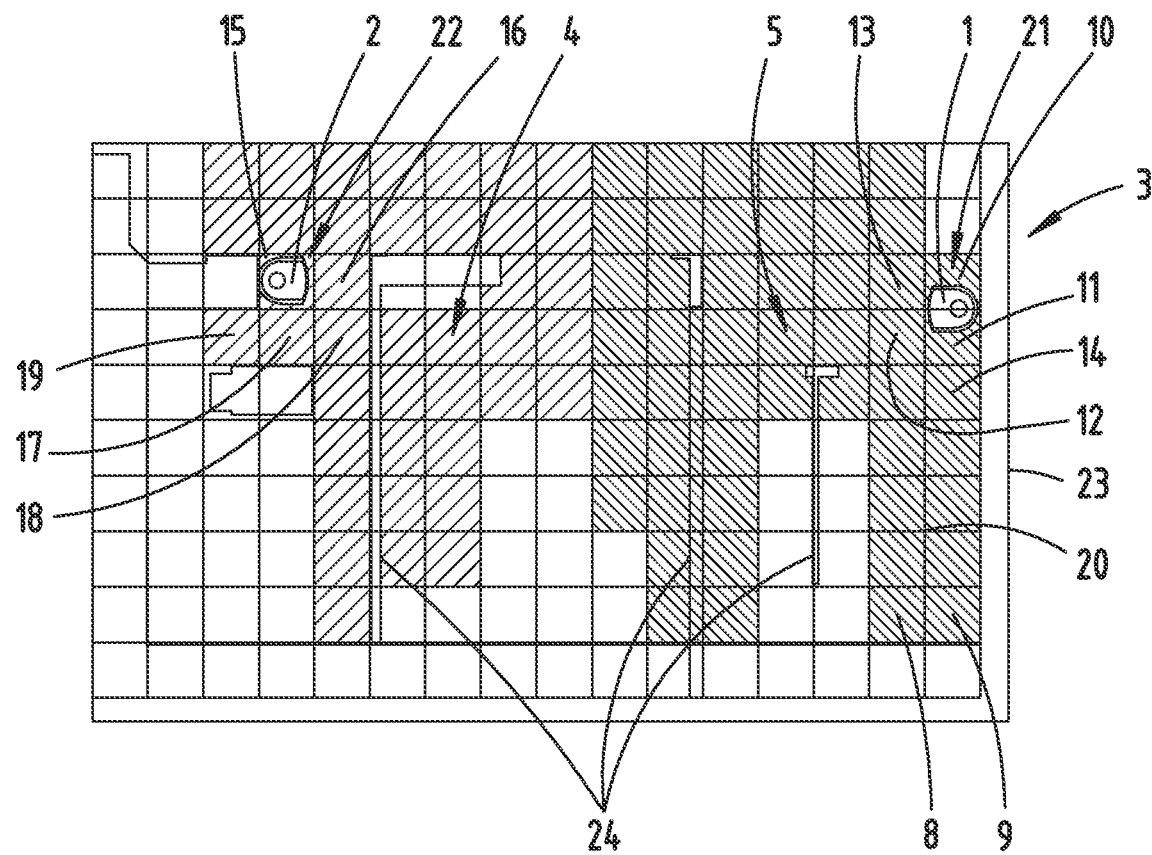

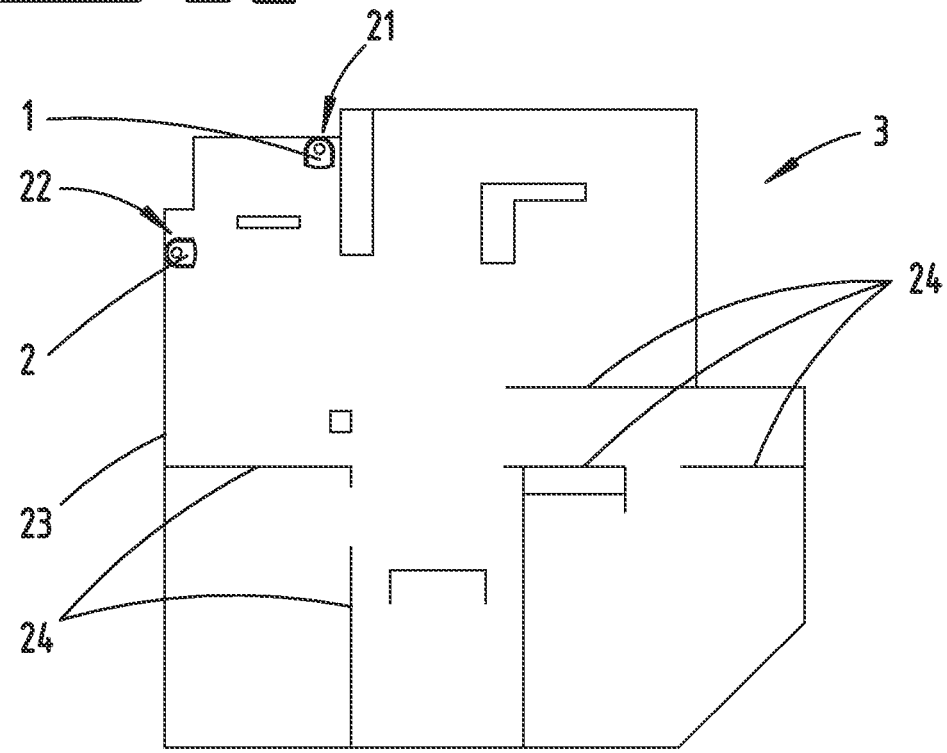
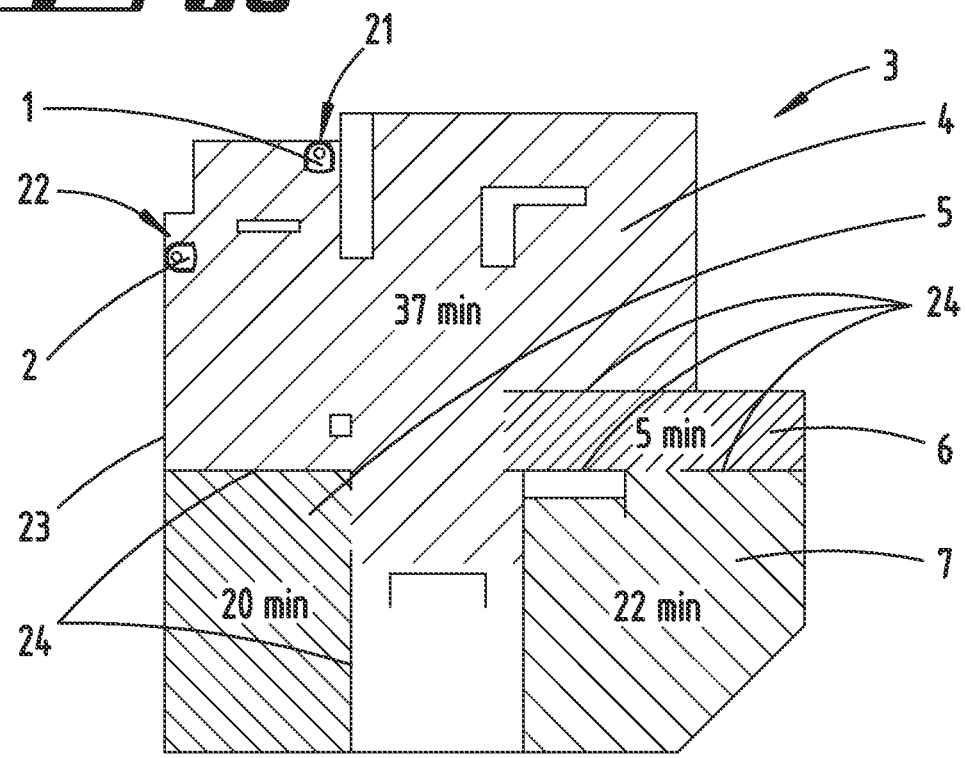

METHOD FOR OPERATING A SYSTEM WITH AT LEAST TWO AUTOMATICALLY MOVING FLOOR PROCESSING DEVICES AS WELL AS SYSTEM FOR IMPLEMENTING SUCH A METHOD

CROSS REFERENCE TO RELATED APPLICATIONS

Applicant claims priority under 35 U.S.C. § 119 of German Application No. 10 2020 100 666.7 filed Jan. 14, 2020, the disclosure of which is incorporated by reference.

BACKGROUND OF THE INVENTION

1. Field of the Invention

The invention relates to a method for operating a system with at least two automatically moving floor processing devices, wherein at least one of the floor processing devices detects environmental features in an environment, and generates an area map based on the detected environmental features, wherein the area map is divided into partial areas, and the partial areas are assigned to the floor processing devices in such a way that each partial area is only processed by one of the floor processing devices.

In addition, the invention relates to a system with at least two floor processing devices, wherein the system is designed to implement such a method.

2. Description of the Related Art

Systems with several such automatically moving floor processing devices are known in prior art. The floor processing devices, for example cleaning devices such as vacuum robots or mopping robots, can together process an environment by assigning partial areas of the environment to the floor processing devices. For example, a first floor processing device processes a first partial area of the environment, while a second floor processing device processes a second partial area.

For example, the floor processing devices can be integrated into a mobile communication system, for example a so-called smart home network, wherein the floor processing devices can communicate with each other either directly or indirectly via a shared access point, a server, a cloud or the like. As also known, floor processing tasks are determined in advance by a task schedule, wherein the floor processing tasks can be divided among the floor processing devices in such a way that the tasks are performed in as time-saving a manner as possible.

For example, Publication WO 2018/202337 A1 discloses a method that involves determining positional information for at least two cleaning devices as well as contamination information for the environment, wherein at least one of the cleaning devices is controlled for cleaning purposes. It is further disclosed that a home appliance controller centrally installed in a household outputs a control command based on a planned movement pattern. Planning a movement route based on the type of a so-called "traveling salesman" problem makes it possible to achieve an optimized treatment of an area in the household to be cleaned with respect to energy to be expended and/or a time required by a cleaning device via the sum of cleaning devices used.

Even though systems and methods of the aforementioned type have proven themselves in prior art, it is still unclear to a user when which cleaning device performs and concludes a cleaning activity. In this regard, uncomfortable situations can arise for a user, in which the latter is disturbed by a cleaning device or has to wait until a cleaning activity has concluded.

SUMMARY OF THE INVENTION

Proceeding from the aforementioned prior art, it is thus the object of the invention to further develop an aforementioned system or method in such a way that the user is adversely affected as little as possible by the floor processing activities of the floor processing devices. It is likewise to be possible to perform the floor processing work with an optimal result, as well as in an energy- and time-saving manner.

In order to achieve the aforementioned object, it is initially proposed that a movement route of the floor processing device tracked during the detection of environmental features as well as a movement timespan that elapsed during the movement along the movement route be detected and stored with the area map, wherein several partial areas are combined into partial area groups, and wherein the partial areas are allocated to the floor processing devices taking into consideration the stored movement route and movement timespan in such a way that a floor processing of a first partial area group by a first floor processing device takes place at essentially the same time as a floor processing of a second partial area group by a second floor processing device is ended.

According to the invention, the partial areas recorded in the area map are divided and allocated in such a way that partial areas combined into groups are prepared in relation to their floor processing operations, ideally simultaneously. For this purpose, the plurality of partial areas are combined into several partial area groups, which can be varied according to defined rules in relation to their position, shape, and size. This takes place provided that the partial area groups created in the environment are processed as simultaneously as possible, and that a user present in the environment has to wait as little as possible, if at all, for remaining individually operating floor processing devices until the latter have also completed their floor processing activity. The indication "essentially simultaneously" or "nearly simultaneously" here means that the floor processing operations performed on the partial area groups by the floor processing devices are ended simultaneously except for such a time difference required by an allocated floor processing device for processing one or fewer partial areas. If the area map is divided into a plurality of partial areas that are sequentially allocated to the floor processing devices for processing, the time difference between the end of processing the first partial area group by the first floor processing device and the end of processing the second partial area group by the second floor processing device can be as large as the timespan required by one of the floor processing devices to process up to ten partial areas of the partial area group allocated to it. The time difference preferably corresponds at most to the processing timespan for up to five partial areas, especially preferably for only one to three partial areas. If the area map is ideally divided into partial areas with the same size and same parameters, and the floor processing devices are also the same, the time difference ideally corresponds at most only to the processing timespan for a single partial area. In practice, however, the partial areas of the environment differ in relation to a floor type present there, a contamination level, an outline, an accessibility of partial areas like corners and surfaces under overhangs for specific floor processing devices, and other parameters. The floor processing devices can likewise differ, for example in relation to their movement speed, processing speed, climbing ability, battery charge, etc. For this reason, a first floor processing device can in practice be finished processing a first partial area group several partial areas earlier than a second floor processing device processing a second partial area group, or vice versa. A typical partial area partitioned off in the area map can be 50 cm×50 cm in size, for example. Depending on the aforementioned parameters of the partial area and the floor processing device, such a partial area can take a timespan of several seconds to a few minutes to process. When deciding which partial area of the environment is to be processed by which floor processing device, consideration is given to how fast each of the floor processing devices can process the respective partial area. This likewise depends on device-specific properties, for example a maximum movement and/or processing speed of the floor processing device, a suitability of the floor processing device for processing specific floor types, a current position of the floor processing device, a current charge status of an accumulator of the floor processing device, a current status of a cleaning agent quantity of the floor processing device, for example water, cleaning additives and the like, a fill level of a dirt collection chamber of a floor processing device or the like. The movement timespan that elapses during detection of the environmental features in the environment, for example within the framework of an exploratory tour by one of the floor processing devices, can be converted to an individual timespan required by a specific floor processing device for processing the respective partial area. To this end, for example, a movement speed of the floor processing device detecting the environmental features is compared with a characteristic movement speed of a floor processing device to be scheduled. In order to enable a comparison, the movement route and movement timespan of the floor processing device detecting the environmental features are stored together with the area map. This can take place either by linking the area map with a file containing the movement route and/or movement timespan, or by directly storing the movement route and/or movement timespan within the area map. Each partial area of the environment preferably has allocated to it information as to whether and if applicable where the floor processing device that detects the environmental features went through the partial area, and how long the floor processing device stayed in the partial area in the process. In addition, the area map or a file allocated thereto can contain information, for example about floor types, contamination types, contamination levels or other properties of the floor surfaces present in the partial areas to be processed. This information can likewise be detected by the floor processing device that determines the environmental features. Alternatively, it would also be possible for a user to manually enter this information into the generated area map or a file linked thereto. The area map or a linked file can also record positions of the floor processing devices, positions of supply units for the latter, i.e., for example charging stations for an accumulator, unloading stations for dirt or wastewater, filling stations for water or cleaning agents, status information for the floor processing devices, such as the charging status of an accumulator, a fill level of a dirt container or the like.

It is proposed that a virtual grid be placed over the generated area map, so as to divide the area of the area map into a plurality of individual partial areas. In particular, it is recommended that the grid have grid cells of the same size, so as to divide the area map into partial areas of the same size. However, it is basically also possible to use an irregular grid.

It is further proposed that it be separately determined for each partial area which device-specific processing timespan each of the floor processing devices would require to process this partial area, wherein the floor processing device with the smallest determined processing timespan is included in the plan for processing this partial area. Since the movement timespan required for generating the area map while detecting the environmental features is characteristic for the floor processing device that performed the detection, the movement timespan allocated to the respective partial area of the environment must be converted to the capabilities and features of the respective floor processing device. In particular, the system can have floor processing devices that differ from each other, which have varying parameters, such as traveling speeds or processing speeds. For this reason, the movement timespan stored with the area map must be adjusted to the individual speed of the floor processing device, so as to achieve an advantageous distribution of partial areas of the area map to the floor processing devices, in the sense that the floor processing activities of several floor processing devices can essentially be concluded at the same time. Since the movement speed of the floor processing devices can also vary depending on the floor type, contamination type and/or contamination quantity in the respective partial area, and hence on the processing speed, a floor type and/or contamination type and/or contamination quantity and/or the like are preferably also stored for the respective partial area of the area map. This information also contributes to calculating the processing timespan for the respective partial area. As proposed, an estimated specific floor processing time for each of the floor processing devices is calculated for the partial areas, wherein the floor processing device having a lowest calculated processing timespan is included in the plan for processing the floor of this partial area. In practice, this floor processing device can be included in the plan for processing a specific partial area by reserving the partial area in the area map for processing by the floor processing device in question. For example, this can be done by giving the partial area a color or some other characteristic marking.

In addition, it is proposed that the processing timespans required by a floor processing device to process several partial areas be added together to yield an overall processing timespan, wherein the floor processing device whose overall processing timespan for previously planned floor processing activities is the lowest without considering the processing timespan for the additional partial area is included in the plan for processing another partial area. Since the partial areas are planned iteratively for specific floor processing devices, the floor processing device—and hence also the partial area group—to which the respective partial area is allocated must be decided anew for each individual partial area. Since the goal of dividing the partial areas among the floor processing devices is to allocate partial areas in such a way as to yield identical or at least by definition highly similar floor processing times for partial area groups comprised of several partial areas, it makes sense that a partial area be assigned only to a floor processing device whose previously planned overall processing timespan is the lowest by comparison to the already planned overall processing timespans of the other floor processing devices. This prevents a floor processing device that always requires very short processing times from being included in the plan for each of the partial areas, which would result in this floor processing device having to perform an overwhelmingly large number of floor processing activities, so that a partial area group allocated to this floor processing device would ultimately be completed significantly later than other partial area groups. In this regard, it is recommended that, as a criterion for selecting a specific floor processing device, it must be satisfied on the one hand that the floor processing device have the smallest processing timespan for an individual partial area in question, and on the other hand that an overall processing timespan already planned for this floor processing device be less than the overall processing timespans of other floor processing devices. Should only one of these criteria be satisfied, the device can define, or the user can prescribe that either a floor processing device with the smallest processing timespan or a floor processing device with the smallest overall processing timespan be selected.

It can preferably be provided that a partial area already included in the plan for floor processing by one of the floor processing devices or a partial area group already included in the plan for floor processing by one of the floor processing devices have added to it a partial area which is directly adjacent to the planned partial area or the planned partial area group. As a result of this embodiment, an already planned partial area or an already planned partial area group preferably has added to it a partial area which has not yet been marked and has direct contact to the partial area of the partial area group.

In this conjunction, it is recommended that one out of several adjacent, not yet planned partial areas initially be added which has a maximum distance to a partial area already planned for processing by another floor processing device or a partial area group already planned for processing by another floor processing device. As a result of the above, in the event more than one partial area is directly adjacent to the planned partial area or the planned partial area group, the partial area having a maximum distance to the planned partial areas of the other floor processing devices is included in the plan for processing by the floor processing device. Not just any adjacent partial area out of a plurality of possible partial areas to be considered is thus selected, but rather one that is simultaneously as far away as possible from the other already planned partial areas or partial area groups of other floor processing devices. As a result, the forming partial area groups can be kept compact, in particular in such a way that their outermost partial areas also lie as close as possible to a current initial starting point of the floor processing device. This is routinely achieved by having the entire planned partial area group assume no oblong shape, but rather preferably form as quadratic an area as possible, or at least an area whose dimensions do not excessively deviate from each other in orthogonal directions. It is preferably proposed that the ratio between the side lengths of the partial area groups lie between 1:1 and 1:10, preferably between 1:1 and 1:5. The ratio between the side lengths also depends not least on a distribution of the starting points of floor processing over the surface of the area map. The further away the starting points of the floor processing devices are from each other, the more oblong the partial area groups can become.

It can advantageously be provided that a partial area for processing that has not yet been assigned to a floor processing device and is not adjacent to a partial area already planned for floor processing by one of the floor processing devices or to a planned partial area group be allocated to a floor processing device whose current location has the smallest distance to the not yet assigned partial area. As a result of allocating such a partial area to a nearest floor processing device, the shape of the partial area group in question is once again kept as compact as possible. However, this embodiment can give rise to partial areas that do belong to a partial area group, but are not directly adjacent to them. Such partial areas of a partial area group lying separated in the area map can be compared relative to their area size with a defined minimum area size, so as to allocate partial areas that do not have the minimum area size to another floor processing device, specifically preferably to such a floor processing device whose floor processing area, i.e., whose allocated partial area group, is adjacent to the separated partial area.

In another embodiment, it can be provided that the partial areas be combined into partial area groups based on a generated layout of the environment, so that room boundaries of the layout border partial area groups, wherein it is determined for each partial area group which processing timespan the respective floor processing device would need to process this partial area group, and wherein the partial area groups are allocated to the floor processing devices for floor processing in such a way that the floor processing operations for the partial area groups are concluded at essentially the same time. In this embodiment, the overall area of the area map is first divided into functional partial area groups, for example rooms in a home. Each partial area group can likewise again have a plurality of partial areas. As already described before, the floor processing times for the individual partial areas, and hence also for the already determined partial area groups, are determined based on the information about the movement route and movement timespan stored for the area map. The partial area groups for which it is known which floor processing device would require which processing timespan for them to be processed are subsequently allocated to the floor processing devices in such a way that the floor processing operations for the partial area groups can be completed at the same time to the extent possible. When allocating the partial area groups to the floor processing devices, the starting positions of the floor processing devices within the area map are preferably considered, so that a specific partial area group is allocated to a floor processing device that has the least distance and/or traveling time to the partial area group in question.

Finally, it is basically recommended that a floor processing activity of a floor processing device in a specific partial area only be planned if the floor processing device is suitable for a floor processing of this partial area. For example, a partial area or a partial area group can have a carpeted floor, which can be cleaned by vacuum cleaners, but not mopping devices. During the partial area allocation described above, the type of floor processing device and the floor are thus also considered, possibly along with other relevant properties.

The area of the area map can be divided into partial areas by a central computing device of the system, or by a local computing device of one of the floor processing devices, in particular of the floor processing device that also detected the environmental features for the area map and subsequently generated the area map. On the other hand, a central computing device can be installed in a so-called cloud, for example. However, local computing devices of the floor processing devices can also function as a central computing device, so that the computations of the partial areas and partial area groups take place via a floor processing device of the system. After the area map has been divided into partial areas and partial area groups, the area map with the processing information is transmitted to the respective floor processing device or prepared for retrieval. Each of the floor processing devices can subsequently perform the floor processing activities planned for the respective floor processing device. In particular, it is recommended that, while performing the floor processing activity, each floor processing device check whether a planned, estimated floor processing timespan for the respective partial area and/or the partial area group can be met. If the computing device of the floor processing device or the system determines that the floor processing activity cannot be performed in the planned processing timespan, partial areas that are adjacent to the partial areas of other floor processing devices can be allocated to the respective adjacent floor processing device. As a result, the planning calculations initiated beforehand are checked even during the performance of the floor processing activity, and if necessary can be adjusted, so that a floor processing operation for a first partial area group is concluded at essentially the same time as a floor processing operation for a second partial area group.

In order to be able to determine a device-specific processing timespan for a floor processing device, characteristic parameters of the respective floor processing device are considered, wherein the parameters can involve parameters that are always present on the one hand, and variable parameters on the other. For example, the variable parameters include an accumulator charging status of an accumulator of the floor processing device or a fill level of a freshwater tank, a wastewater tank, a suction material container or the like. For example, permanently present parameters can involve the configuration of the floor processing device as a vacuum cleaner or mopping device, a tool always present on the floor processing device, a maximum working speed and/or movement speed and the like. Among other things, such parameters of the floor processing device determine the processing timespan required by the floor processing device as a whole for processing a partial area of the environment. When including a floor processing device in the plan for processing a specific partial area, it is recommended, for example, that consideration be given to the charging status of an accumulator of a floor processing device, and also, as a function thereof, to the floor processing timespan that can be handled without again recharging the accumulator. This processing timespan can be considered while allocating the partial areas insofar as partial areas that take up a processing time which exceeds the maximum performable processing timespan cannot be processed by the floor processing device in question. When planning the partial areas, this means that no additional partial areas of the environment can then potentially be included in the plan for a specific floor processing device, and that a maximum size of the partial area group intended for this floor processing device has been reached. The same procedure is preferably followed if other equipment of the floor processing device limits the maximum possible processing timespan, for example a storage capacity and/or fill level of equipment such as the freshwater tank, wastewater tank and/or dirt container.

While determining the partial area groups or subsequent floor processing of the partial area groups, it is further recommended that floor processing devices be prevented from colliding with each other. In order to prevent a collision, a movement route is preferably initially planned for a first floor processing device, and the accompanying partial areas are marked with a time specification that denotes when the floor processing device traverses and again exits a specific partial area. The marked partial areas must be avoided in the indicated time period with respect to the movement route for a second floor processing device. As a result, collisions do not take place. If no such collision avoidance is programmed in advance, situations can arise in which two floor processing devices encounter each other. While this does not prevent floor processing, delays can arise in floor processing, since the floor processing devices must exit an already preplanned movement route in order to avoid the other floor processing device.

It is further also possible to vary a movement route planned for a floor processing device and/or the association of one or several partial areas with the established partial area groups, for example in order to be able to react to outside influences or changes in power consumption of a floor processing device, or to other varying parameters of the floor processing device. For example, if it is determined during a floor processing operation that the floor processing device allocated to the respective partial area group requires more or less power than planned, the partial areas could then be reallocated to the planned partial area groups of the environment.

Finally, the invention also proposes a system with at least two floor processing devices, wherein the system is designed and set up to implement a method described above. The system can contain two or more floor processing devices, which in particular are automatically moving floor processing devices, and for example are designed as vacuum cleaners and/or mopping devices, polishing devices, grinding devices, mowing devices or others.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

FIG. 1 is a layout of a home;

FIG. 2a-b is an allocation of partial areas of the layout to two floor processing devices;

FIG. 3 is a space of the layout with a movement route of a floor processing device;

FIG. 4a-j is an allocation of partial areas of the layout to two floor processing devices; and FIG. 5a-b is an allocation of partial area groups to two floor processing devices.

DETAILED DESCRIPTION OF PREFERRED EMBODIMENTS

Figure 4A:
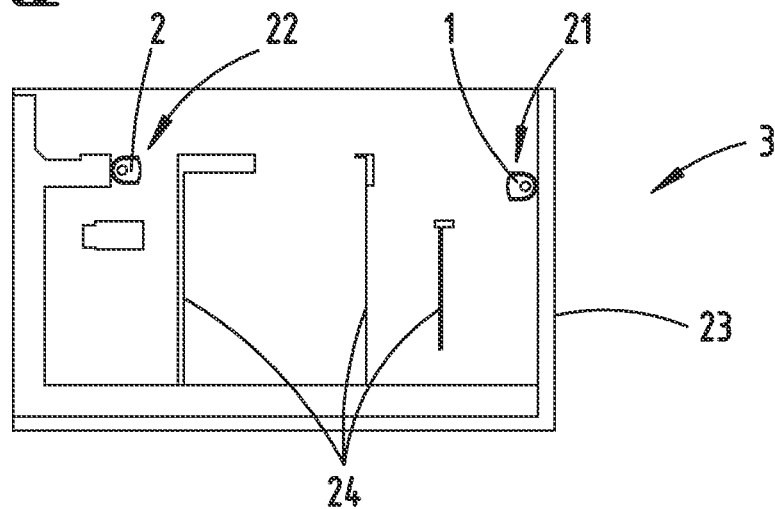

FIG. 1 shows a layout 23 of a home with several rooms, which are separated from each other by room boundaries 24. As usual, the rooms have furniture items as well as several floor processing devices 1, 2, here cleaning robots, of which two are exemplarily marked as a first floor processing device 1 and second floor processing device 2. Each of the floor processing devices 1, 2 is designed as an automatically moving floor processing device 1, 2. For purposes of automatic navigation, the floor processing devices 1, 2 have a navigation and self-localizing system, which is set up to navigate the respective floor processing device 1, 2 through the home based on an area map 3 (for example, see FIGS. 2a and 2b). The area map 3 is preferably an area map 3 generated by the floor processing device 1, 2 itself, which contains the layout 23 of the environment, the furniture items, room boundaries 24 and the locations 21, 22 of the floor processing devices 1, 2. A movement route 25 through the rooms of the home can be further be established based on the area map 3. In order to generate the area map 3, the floor processing device 1, 2 preferably has a distance measuring device, which measures distances to obstacles, for example furniture items and room boundaries 24, in the environment. The measured distances are finally processed further to yield the area map 3. The distance measuring device can be an optical measuring device, in particular a laser scanner.

FIGS. 2a and 2b show an exemplary area map 3 with an environment divided into a plurality of individual partial areas 10-19. Furniture items and room boundaries 24 are only denoted. As shown, a grid 20 with a plurality of grid cells 8, 9, e.g., which are here the same size, is placed over the area map 3, thus resulting in the partial areas 10-19. Each of the floor processing devices 1, 2 present in the environment has allocated to it a plurality of partial areas 10-19, which together form partial area groups 4, 5. Each of the partial area groups 4, 5 is only allocated to one of the floor processing devices 1, 2, wherein the respective partial area group 4, 5 contains the partial area 10, 19 with the location 21, 22 of the corresponding floor processing device 1, 2.

FIG. 3 only exemplarily shows a room in an environment, in which a movement route 25 for a floor processing device 1, 2 is marked. The movement route 25 meanders through the room, wherein the movement route 25 has allocated to it time specifications, which characterize the movement time of a floor processing device 1 in a respective partial section of the movement route 25. For example, the movement route 25 here contains long and short partial sections of the meandering shape, wherein the floor processing device 1 here needs two minutes of movement time for the long partial sections, and thirty seconds of movement time for the short partial sections, for example.

Figure 4B:
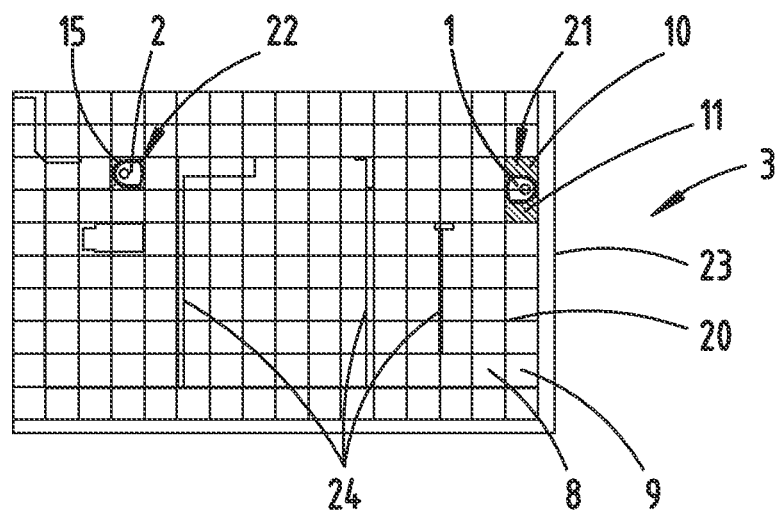
Figure 4C:
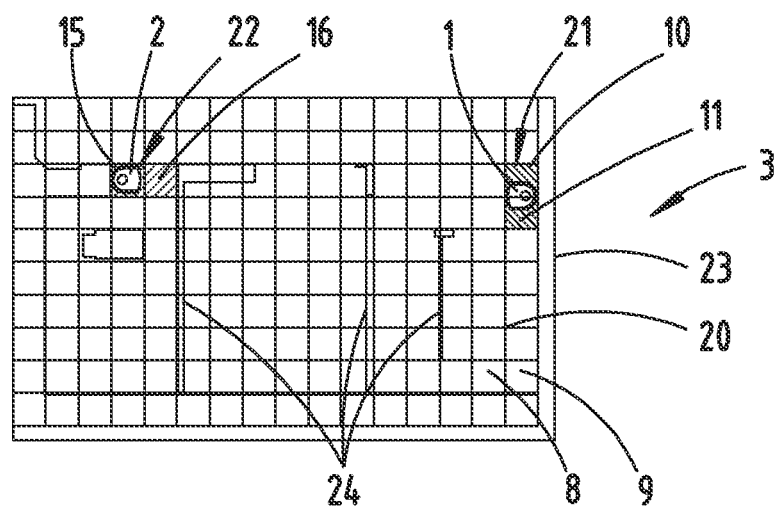

FIGS. 4 (FIGS. 4a to 4j) and 5 (FIGS. 5a and 5b) exemplarily show two different embodiments of the invention, in which a plurality of partial areas 10-19 to be processed is allocated to several floor processing devices 1, 2 of a floor processing system in such a way that the floor processing devices 1, 2 complete their floor processing activities at essentially the same time. In this regard, the figures will be discussed in more detail below.

For example, the invention functions in such a way that a floor processing device 1, 2 of the system, preferably a floor processing device 1, 2 that will later also process partial areas 10-19 of the environment, initially generates an area map and traverses the environment for this purpose. While the floor processing device 1, 2 detects the environmental features for generating the area map 3, its movement route 25 is recorded. A movement timespan is allocated to the movement route 25, which denotes the timespan required by the floor processing device 1, 2 to traverse the movement route 25. For example, the movement route 25 is here the movement route 25 shown on FIG. 3. Partial segments of the movement route 25 are there notated with accompanying partial timespans, within which the floor processing device 1, 2 stayed in the respective partial segment of the movement route 25. The movement route 25 as well as the characteristic movement timespan of this floor processing device 1, 2 are stored in conjunction with the area map 3, preferably in a local memory of the floor processing device 1, 2 or a separate storage device of the system accessible to all floor processing devices 1, 2. While moving along the movement route 25, the floor processing device 1, 2 can further detect properties of the environment and likewise note them in the area map 3 or store them linked with the area map 3. For example, properties in the environment include a condition of a floor surface, among other things a floor type, e.g., divided into a hard floor and carpeted floor, a contamination level of the environment, a type and severity of contamination. In addition, the floor processing device 1, 2 can detect the current whereabouts of floor processing devices 1, 2 of the system as well as locations of supply units for the floor processing devices 1, 2. For example, the supply units include accumulator charging stations, supply and disposal stations for water, cleaning agents, cleaning accessories and the like. The floor processing device 1, 2 preferably traverses the entire environment, i.e., the entire home of the user, and records the environmental features. Not only the area map 3 itself is subsequently known, but so too are the movement route 25, the accompanying travel time (movement timespan) of the associated floor processing device 1, 2, floor types and other possible parameters detected by the floor processing device 1, 2.

The environment of the floor processing devices 1, 2 will now be divided up below in such a way that the floor surface to be processed is efficiently cleaned in a manner advantageous to the user, such that all floor processing devices 1, 2 of the system conclude their floor processing operations at nearly the same time, and the environment is thus completely cleaned "in one fell swoop". For this purpose, it is provided that the floor processing devices 1, 2 simultaneously perform floor processing activities in various partial areas 10-19 of the environment.

As shown on FIGS. 2a and 2b, the grid 20 is to this end initially placed over the area map 3, so that partial areas 10-19 of the same size are partitioned in the area map 3. Each grid cell 8, 9 comprises an independent partial area 10-19. Each partial area 10-19 is then allocated to one of the floor processing devices 1, 2 for processing. Initially, the process involves calculating a device-specific processing timespan for each individual floor processing device 1, 2 for processing the respective partial area 10-19. For this purpose, the movement route 25 and movement timespan recorded previously according to FIG. 3 are adjusted to the characteristic parameters of the respective floor processing device 1, 2. To this end, in particular the movement timespan measured during the exploratory tour along the movement route 25 is "calibrated" to the capabilities of the floor processing device 1, 2, in particular to its specific movement speed during the processing activity to be performed. The floor processing device 1, 2 that requires the least device-specific processing timespan according to the calculations is then assigned to process the partial area 10-19 in question. In relation to the area map 3 shown on FIGS. 2a and 2b, this means that corresponding grid cells 8, 9 are marked as "reserved" for this floor processing device 1, 2. However, the floor processing device 1, 2 with the least characteristic processing timespan only receives the approval for processing the floor of the respective partial area 10-19 if the partial areas 10-19 previously assigned ("reserved") for this floor processing device 1, 2 in the grand total simultaneously require an overall processing timespan that is less than all of the overall processing timespans of the other floor processing devices 1, 2 of the system added together. As a consequence, only the floor processing devices 1, 2 whose partial surface previously planned for processing requires a least floor processing time receives an allocation to this partial area 10-19. This methodology ensures that the floor processing devices 1, 2 of the system will conclude their floor processing activities within the environment at essentially the same time. The partial areas 10-19 of the area map 3 are sequentially assigned to the floor processing devices 1, 2 until all partial areas 10-19 have ultimately been allocated to one of the floor processing devices 1, 2.

As shown on FIGS. 2a and 2b, processing by one of the floor processing devices 1, 2 initially involves earmarking the partial area 10, 19 in which the current location 21, 22 of the floor processing device 1, 2 is situated. This is usually a starting point of the floor processing device 1, 2 at an allocated base station. Proceeding from the grid cell 8, 9 (=partial area 10, 19) containing the respective location 21, 22, the remaining partial areas 11-18 of the area map 3 are then planned, wherein a partial area 11, 18 lying adjacent to the location 21, 22 is preferably assigned to processing next. As a consequence, the partial area 11-18 that is marked first is the one which had previously not yet been planned for processing and directly borders the already assigned partial areas 10, 19 of the floor processing devices 1, 2. If more than one partial area 11-18 satisfies these requirements, the partial area 11-18 that is assigned to processing by a first floor processing device 1, 2 has a maximum distance to partial areas 10-19 assigned to another floor processing device 1, 2.

A partial area 17 allocated to a specific floor processing device 2 that has no direct contact to partial areas 10-14 likewise allocated to the same floor processing device 2 (see FIG. 2a) is preferably allocated to the floor processing device 1 whose initial location has the least distance to the as yet unassigned partial area 17. For example, separate partial areas 10-19 that are not directly associated with other partial areas 10-19 of the same floor processing device 1, 2 can arise behind obstacles, furniture items, walls, etc. As shown on FIG. 2a, for example, a separate partial area 17 exists, which initially is assigned to the second floor processing device 2, but is not adjacent to the remaining partial areas 10-14 of this floor processing device 2. In order to optimize the route planning for the floor processing devices 1, 2, it can be provided that such a separate partial area 17 be allocated to another floor processing device 1, 2 if the partial area 17 does not exceed a defined minimum value. For example, the partial area 17 is here allocated to the other floor processing device 1 accordingly (see FIG. 2b). As a result, a partial area group 4, 5 arises for each of the floor processing devices 1, 2 in the area map 3, which has a plurality of partial areas 10-19 to be processed by the respective floor processing device 1, 2. According to FIG. 2b, partial areas 15-19 are ultimately allocated to the first floor processing device 1, while the second floor processing device 2 is assigned to process partial areas 10-14.

The division of partial areas 10-19 among the floor processing devices 1, 2 preferably takes place centrally, for example by means of a computing device that is allocated to a server of the system. For example, the server can be located in a so-called "cloud", on a local household computer or within a floor processing device 1, 2 itself. Once the partial areas 10-19 have been assigned, the area map 3 provided with markings is transmitted to the respective floor processing devices 1, 2 of the system or prepared for retrieval for the latter, so that the floor processing activities can be started. While the floor processing activity is being performed, it can be provided that the floor processing devices 1, 2 check whether the planned device-specific processing timespan can be met. For example, if a processing timespan cannot be met due to an unforeseen event, e.g., the presence of a person in a partial area 10-19, partial areas 10-19, for example which are adjacent to the partial areas 10-19 of other floor processing devices 1, 2, can be allocated to the other floor processing devices 1, 2. As a result, compliance with the planned processing timespan is monitored during the floor processing operation in such a way that the floor processing devices 1, 2 complete the partial area groups 4-7 assigned to them at essentially the same time.

An additional example for an allocation of partial areas 10-19 to two different floor processing devices 1, 2 is now shown based on FIGS. 4a to 4j, wherein each of the floor processing devices 1, 2 has formed for it a partial area group 4, 5, which comprises a plurality of partial areas 10-19 to be processed and is to be processed by the allocated floor processing device 1, 2. For example, the areas not assigned in the area map 3 (see area map 3 according to FIG. 4) are those which have obstacles like furniture items or room boundaries 24. Proceeding from FIG. 4a, an area map 3 is available at the outset which contains the location 21, 22 of two floor processing devices 1, 2 as well as a layout 23 with room boundaries 24. As shown on FIG. 4b, a grid 20 with grid cells 8, 9 of the same size is subsequently placed over the area map 3, which are to be allocated to the floor processing devices 1, 2 for processing. Those grid cells 8, 9 containing the location 21, 22 of the floor processing devices 1, 2 are initially marked for the respective floor processing device 1, 2, i.e., the grid cell 8, 9 with the location 21 of the first floor processing device 1 is allocated to the first floor processing device for processing, and the location 22 of the second floor processing device 2 correspondingly to the second floor processing device 2. In other words, as shown on FIG. 4b, two grid cells 8, 9 lying closest to the location 21 of the floor processing device 1 that form partial areas 10, 11 of the area map 3 are assigned for the floor processing device 1. The partial area 15 having the location 22 of this floor processing device 2 is allocated to the floor processing device 2 for processing. For the additional partial areas 12, 13, 14, 16, 17, 18, 19 of the area map, a check is then performed to determine what traveling time and what traveling route each floor processing device 1, 2 would have had to the partial area (12-14, 16-19), and what device-specific processing timespan the respective floor processing device 1, 2 would require to clean the partial area (12-14, 16-19). Finally, a check is also performed to determine whether the floor processing device 1, 2 is suitable for processing this partial area (12-14, 16-19). This is especially relevant if the partial areas 10-19 of the area map 3 have floor types that are unsuitable for floor cleaning by one of the floor processing devices 1, 2. In this case, the respective floor processing device 1, 2 is excluded from processing the partial area 10-19 in question.

In addition, an overall processing timespan is added up for each floor processing device 1, 2, which contains the individual processing timespans for the partial areas 10-19 already assigned to the floor processing device 1, 2. In FIG. 4b, for example, the first floor processing device 1 is already set aside for processing the partial areas 10 and 11, which in all takes an overall processing timespan of two minutes, for example, while the second floor processing device 2 was previously only included in the plan for processing the partial area 15, the processing of which takes a processing timespan of one minute, for example. In the processing step according to FIG. 4c, a next partial area 16 adjacent to the partial area 15 of the second floor processing device 2 is subsequently allocated. Once again, a distance between the floor processing devices 1, 2 and the partial area 16, a device-specific processing timespan and device-specific overall processing timespan as well as floor type are considered or calculated, so as to determine the floor processing device 1, 2 that is to be set aside for processing this partial area 16. In the example according to FIG. 4c, the partial area 16 is allocated to the second floor processing device 2, since it has the smallest previous overall processing timespan, and in addition is adjacent to the partial area 15 of the second floor processing device 2. The allocation of remaining partial areas 12-14, 17-19 is continued in this way, until partial area groups 4, 5 have ultimately been formed, which comprise all partial areas 10-19 of the environment (see FIG. 4j). The unallocated partial areas (blank grid cells 8, 9) cannot be traversed by any of the floor processing devices 1, 2, for example because objects cover the floor surface there. As a result, the traversable and allocated partial areas 10-19 are combined into partial area groups 4, 5 in such a way that the floor processing devices 1, 2 complete their floor processing operations in the allocated partial area groups 4, 5 at essentially the same time.

FIGS. 5a and 5b show another embodiment of the invention. In this embodiment, partial area groups 4-7 are identified in the generated area map 3 within the layout 23. The partial area groups 4-7 are partitioned off by room boundaries 24. As a consequence, the overall area of the area map 3 is here broken down into functional partial areas, specifically rooms in a home, for example a kitchen, a bedroom, a hallway, a living room, and a bathroom. Device-specific overall processing timespans for the partial area groups 4-7 are subsequently determined, which the respective floor processing device 1, 2 would need for processing the respective partial area group 4-7, wherein each of the partial area groups 4-7 could in turn be subdivided into individual partial areas 10-19 (not shown) to simplify the execution of calculations. The partial area groups 4-7 are subsequently allocated to the floor processing devices 1, 2 in such a way that the respective overall processing times of the floor processing devices 1, 2 are approximately the same length. As shown on FIG. 5b, for example, four partial area groups 4-7 arise here. For example, the investigating floor processing device 1, 2 needed a timespan of 37 minutes for the first partial area group 4, a timespan of 20 minutes for the second partial area group 5, a timespan of 5 minutes for the third partial areas group 6 and a timespan of 7 minutes for the fourth partial area group 7. Provided that the estimated overall processing timespans for the floor processing devices 1, 2 handling the floor processing operations are exactly as high as the required timespans of the previously investigating floor processing devices 1, 2, the partial area groups 4-7 are here assigned to the floor processing devices 1, 2 in such a way that the first floor processing device 1 is used to process the partial area groups 4 and 6, while the partial area groups 5 and 7 are to be processed by the second floor processing device 2. Both floor processing devices 1, 2 each require 42 minutes to process the partial area groups 4-7 assigned to them, and are here thus finished with floor processing at the same time. If the device-specific processing speeds of the floor processing devices 1, 2 for processing the partial area groups 4-7 deviate from the speed of the floor processing device 1, 2 initially investigating the environment, the specific timespan of the investigating floor processing device 1, 2 must initially be converted to the characteristic parameters of the floor processing device 1, 2 handling the floor processing operations, so as to then ultimately assign the partial areas 4-7 in such a way that the floor processing devices 1, 2 can complete the floor processing operations simultaneously or essentially [at the same time].

Although only a few embodiments of the present invention have been shown and described, it is to be understood that many changes and modifications may be made thereunto without departing from the spirit and scope of the invention.

LIST OF REFERENCES

1 Floor processing device
2 Floor processing device
3 Area map
4 Partial area group
5 Partial area group
6 Partial area group
7 Partial area group
8 Grid cell
9 Grid cell
10 Partial area
11 Partial area
12 Partial area
13 Partial area
14 Partial area
15 Partial area
16 Partial area
17 Partial area
18 Partial area
19 Partial area
20 Grid
21 Location
22 Location
23 Layout
24 Room boundary
25 Movement route

What is claimed is:

1. A method for operating a system with at least two automatically moving floor processing devices, comprising:
    detecting with at least one of the floor processing devices environmental features in an environment,
    generating an area map based on the detected environmental features, wherein the area map is divided into partial areas,
    assigning the partial areas to the floor processing devices, and
    processing the partial areas with the floor processing devices so that each partial area is processed by only one of the floor processing devices,
    wherein a movement route of the at least one floor processing device tracked during the step of detecting as well as a movement timespan that elapsed during a movement along the movement route are detected and stored with the area map,
    wherein several of the partial areas are combined into partial area groups, and wherein the partial areas are allocated to the floor processing devices, taking into consideration the stored movement route and the movement timespan in such a way that a floor processing of a first partial area group by a first one of the floor processing devices takes place at essentially the same time as a floor processing of a second partial area group by a second one of the floor processing devices is ended.

2. The method according to claim 1, further comprising the step of determining a device-specific processing timespan that each of the floor processing devices requires to process an individual partial area, wherein the floor processing device with a smallest determined processing timespan is assigned to process said individual partial area.

3. The method according to claim 2, wherein information about a floor type to be processed in each partial area is stored for each partial area, and further comprising the step of determining for each floor processing device which floor type-specific processing timespan the respective floor processing device would need for processing each partial area.

4. The method according to claim 2, wherein the processing timespans required by one of the floor processing devices to process several partial areas are added together to yield an overall processing timespan, wherein the floor processing device whose overall processing timespan for previously planned floor processing activities is lowest without considering the processing timespan for the other partial areas is included in a plan for processing another partial area.

5. The method according to claim 2, wherein the partial areas are combined into partial area groups based on a generated layout of the environment, so that room boundaries of the generated layout border partial area groups, and further comprising determining for each partial area group which processing timespan the respective floor processing device would need to process this partial area group, and wherein the partial area groups are allocated to the floor processing devices for floor processing in such a way that floor processing operations for the partial area groups are concluded at essentially the same time.

6. The method according to claim 1, further comprising the step of assigning one of the partial areas, which is directly adjacent to a partial area or planned partial area group already assigned to one of the floor processing devices, to the one floor processing device.

7. The method according to claim 6, wherein one out of several adjacent, not yet planned partial areas is initially assigned to one of the floor processing devices, the one partial area having a maximum distance to a partial area already planned for processing by another one of the floor processing devices or a partial area group already planned for processing by another one of the floor processing devices.

8. The method according to claim 1, wherein a partial area for processing that has not yet been assigned to one of the floor processing devices and is not adjacent to a partial area already planned for floor processing by one of the floor processing devices or to a planned partial area group, is assigned to one of the floor processing devices whose current location has a smallest distance to the not yet assigned partial area.

9. The method according to claim 1, wherein a floor processing activity of one of the floor processing devices in a specific partial area is only planned if the one floor processing device is suitable for a floor processing of this partial area.

10. A system with at least two floor processing devices, wherein the system is designed to implement a method according to claim 1.

* * * * *